US006619899B1

US 6,619,899 B1

(12) United States Patent
Gaudron

(10) Patent No.: US 6,619,899 B1
(45) Date of Patent: Sep. 16, 2003

(54) CUTTING INSERT FOR FASTENERS

(75) Inventor: Paul Gaudron, Stamford, CT (US)

(73) Assignee: Power Products III, LLC, New Rochelle, NY (US)

(*) Notice: Subject to any disclaimer, the term of this patent is extended or adjusted under 35 U.S.C. 154(b) by 0 days.

(21) Appl. No.: 10/166,527

(22) Filed: Jun. 10, 2002

(51) Int. Cl.[7] .......................... F16B 25/00; F16B 25/10
(52) U.S. Cl. ................. 411/386; 411/387.1; 411/412
(58) Field of Search ............... 411/29–31, 387.1–387.8, 411/412, 413, 386

(56) References Cited

U.S. PATENT DOCUMENTS

| 410,697 A | | 9/1889 | Rogers ........................ 411/412 |
|---|---|---|---|
| 4,257,307 A | * | 3/1981 | Regensburger .......... 411/387.1 |
| 4,329,099 A | | 5/1982 | Shimizu et al. ............. 411/412 |
| 4,439,077 A | | 3/1984 | Godsted ..................... 411/411 |
| 4,652,194 A | | 3/1987 | Tajima et al. ............... 411/417 |
| 5,061,136 A | | 10/1991 | Dixon et al. ................ 411/412 |
| 5,213,459 A | * | 5/1993 | Palm ......................... 411/387.1 |
| 5,531,553 A | | 7/1996 | Bickford ..................... 411/389 |
| 5,551,818 A | * | 9/1996 | Koppel ..................... 411/387.1 |
| 5,749,689 A | * | 5/1998 | Konig ....................... 411/29 X |
| 5,957,646 A | | 9/1999 | Giannuzzi et al. .......... 411/412 |
| 6,309,159 B1 | * | 10/2001 | Weaver et al. ......... 411/387.1 X |

FOREIGN PATENT DOCUMENTS

DE          54903          9/1889

* cited by examiner

*Primary Examiner*—Neill Wilson
(74) *Attorney, Agent, or Firm*—Morgan, Lewis & Bockius LLP

(57) ABSTRACT

A cutting insert for fasteners having a shape with an outline conforming to at least a portion of a contour of a cross-section of on end of on fastener. The insert being made of a material sufficiently strong to provide for self-tapping in application of the fastener.

20 Claims, 1 Drawing Sheet

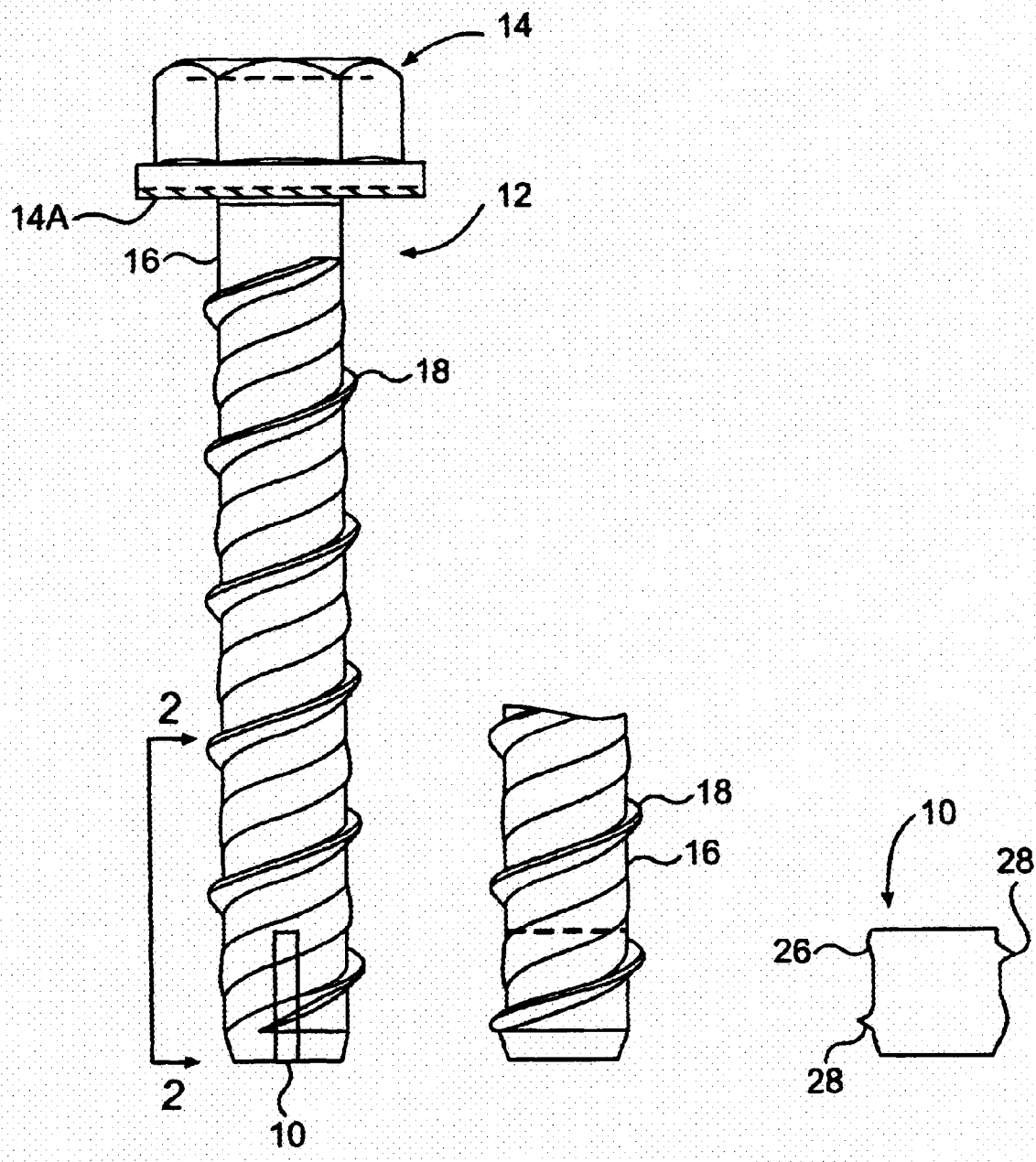
FIG. 1  FIG. 2  FIG. 3

CUTTING INSERT FOR FASTENERS

BACKGROUND

1. Field of Invention

The instant invention generally relates to screw-type self-tapping fasteners. More particularly, the present invention relates to fasteners having multiple lead cutting threads that enhance the holding power of the fastener. While the present invention is directed generally to the field of masonry fasteners, it can be readily understood that application of the invention can be extended to other fasteners and other materials for use therewith.

2. State of the Art

Screw-type fasteners for fastening fixtures and various attachments for masonry and other materials are well known. Fasteners of this type generally include a helical cutting thread formed on the shank of the fastener, which acts to cut and tap the bank of a predrilled hole as the fastener is turned into the hole. The resistance of this fastener to axial pullout forces represents its holding power.

The term masonry is generic to all stone-like building materials, such as concrete and brick. When masonry is exceptionally hard, such as masonry whose aggregate is formed of granite, the torque required to turn the fastener into the predrilled hole is very high; so high, in fact, that the fastener may break.

To create a fastener capable of being screwed into exceptionally hard masonry, prior art fasteners have been provided with a helical thread having a V-shaped cross-sectional configuration in which the flanks of the threads intersect at an included angle of approximately 50 to 65 degrees. While this type of thread is capable of cutting into hard masonry, it is relatively fragile and may rupture.

Other prior art fasteners have a sharp-crested helical thread in which notches are formed in the crests of the thread to facilitate embedment of the crests in the bank of a predrilled hole. Aggregate particles cut from the bank of the masonry hole by the notches are collected in a reservoir in the space between successive convolutions of the thread. Since the particles are collected in this manner, they reduce torsional friction. Additionally, the retention of the particles in the reservoirs can enhance the pull out force of the fastener.

Yet another prior art self-tapping masonry fastener is provided with a helical cutting thread surrounding the shank of the fastener. The cutting thread is formed by a pair of parallel helical ridges with a depressed groove therebetween, which serves to collect substrate debris removed by the cutting action. Thus, even if particulate debris collected in the groove in the helical cutting thread were compacted, it would only serve to resist displacement of the helical thread with respect to the corresponding female thread cut into the bank of the hole. Nevertheless, this would not serve to significantly enhance the holding power of the fastener.

As evidenced by the above mentioned prior art fasteners, there is a recognized need for a more effective cutting edge, especially for self-tapping fasteners.

OBJECTS AND SUMMARY OF THE INVENTION

Accordingly, it is an object of the present invention to provide an effective cutting edge for fasteners.

Another object of the present invention is to provide self-tapping fasteners with a reinforced cutting edge.

It is a further object of the present invention to provide a cutting insert for fasteners.

It is yet a further object of the present invention to provide a combination fastener with cutting insert.

It is still another object of the present invention to provide a process of manufacture of a cutting insert for fasteners and/or a combination fastener with a cutting insert.

These and other objects of the present invention will be apparent in the following description.

The present invention provides a cutting insert for fasteners including a shape having an outline conforming to at least a portion of a contour of a cross-section of an end of a fastener. Additionally, the insert may have at least one thread protrusion for cutting a groove to thereby provide a track into which threads of the fastener would follow.

The present invention also provides a process of cutting insert for fasteners and/or a combination fastener with a cutting insert including steps of providing a flat sheet of a material from which the cutting insert is punched or stamped. Additional steps are included to provide a fastener with a slit at its tip. Yet another step includes stamping the material to provide the cutting insert shaped to fit into the slit at the tip of the fastener, and placing the cutting insert into the slit.

Additionally, the present invention provides a combination fastener and cutting insert, including a fastener having a slit at its end and a cutting insert having a shape with an outline conforming to at least a portion of a contour of a cross-section of the end of the fastener.

BRIEF DESCRIPTION OF THE FIGURES

FIG. 1 depicts a fastener with a reinforced insert in accordance with the present invention.

FIG. 2 depicts a section of the fastener with a reinforced insert of FIG. 1 as viewed along lines 2—2.

FIG. 3 depicts the cutting insert in accordance with the present invention.

DETAILED DESCRIPTION

With reference now to the figures and, in particular, with reference to FIGS. 1–3, there is depicted a representation of a cutting insert for fasteners of the present invention. The fastener 12 depicted in the figures is a self-tapping screw-type fastener, and is simply shown for example only, and not to be limited thereto. This type of fastener is generally installed in a predrilled hole in a hard substance formed of concrete or other stone-like material, but not limited thereto.

The fastener, which may be fabricated of any material, but for the purpose of providing an example only, and not to be limited thereto, the description of the present invention will focus on stainless steel or other corrosion-resistant materials. When working with a hard substance, into which the fastener must be inserted, corrosion-resistant materials may not be hard enough to permit the threads of the fastener to adequately dig into the substance. The present invention provides a cutting insert 10 (FIG. 3) for the fastener 12 depicted in FIGS. 1 and 2 that may be made of a material that is stronger or better suited than the fastener material, and thereby facilitate at least one leading edge to provide a passage for the fastener thread.

The fastener depicted in the present invention has an enlarged head 14 in a hexagonal shape so that it can be engaged by a wrench or other torque-producing tool to turn the fastener into the hole. The underside 14A of the head is serrated to fictionally engage the surface of the fixture when tightening the fastener. In practice, however, the fastener may be of any type.

Integral with head 14 of the fastener 12 and extending axially therefrom is a shank 16 having a diameter that may be somewhat smaller than that of the drilled masonry hole. The shank may terminate at its leading end in a tip having a frusto-conical form to guide the leading end of the shank into the hole. The contour of the shank may take any desirable form and includes threads 18.

The cutting insert 10 of the present invention may generally take the shape of the cross-section of the tip portion of the fastener. Thus, the insert includes the contour 26 of the tip and thread protrusions 28 for cutting a groove or passage for the threads of the fastener.

In practice for example only, and not to be limited thereto, a hole is first drilled into a hard substance. The tip of the fastener is placed in the opening of the hole, and the fastener is turned utilizing a torque-producing tool. As the fastener is turned the thread protrusions 28 of the insert 10 cut grooves into the wall of the hole thereby providing a track into which the threads 16 follow and anchor the fastener and any fixture for which it is utilized.

The cutting insert of the present invention may be easily and cheaply manufactured. One manner, but not to be limited thereto, is to provide a sheet of a strong material at a predetermined thickness and stamping out the cutting insert in the desired shape. Another manner, but not to be limited thereto, may be to utilize mold casting in the making of the cutting insert. The cutting insert is designed to fit into a slit at the tip of any fastener. Accordingly, the shape and thickness of the insert would depend on the size and shape of the tip of the fastener and the slit made therein.

While the foregoing has described and exemplified aspects of various embodiments of the present invention, those skilled in the art will recognize that alternative elements and techniques, and/or combinations and sub-combinations of the described elements and techniques, can be substituted for, or added to, the embodiments and methods described herein. The present invention, therefore, should not be limited to, or defined by, the specific apparatus, methods, and articles-of-manufacture described herein, but rather by the appended claims, which are intended to be construed in accordance with well-settled principles of claim construction, including, but not limited to, the following:

Limitations should not be read from the specification or drawings into the claims (e.g., if the claim calls for a "chair," and the specification and drawings show a rocking chair, the claim term "chair" should not be limited to a rocking chair, but rather should be construed to cover any type of "chair").

The words "comprising," "including," and "having" are always open-ended, irrespective of whether they appear as the primary transitional phrase of a claim, or as a transitional phrase within an element or sub-element of the claim (e.g., the claim "a widget comprising: A; B; and C" would be infringed by a device containing 2A's, B, and 3C's; also, the claim "a gizmo comprising: A; B, including X, Y, and Z; and C, having P and Q" would be infringed by a device containing 3A's, 2X's, 3Y's, Z, 6P's, and Q).

The indefinite articles "a" or "an" mean "one or more"; where, instead, a purely singular meaning is intended, a phrase such as "one," "only one," or "a single," will appear.

Where the phrase "means for" precedes a function, it is intended that the resulting means-plus-function element be construed to cover any, and all, implementations of the recited function using any standard techniques known by, or available to, persons skilled in the relevant art. A claim that contains more than one means-plus-function element should not be construed to require that each means-plus-function element must be a structurally distinct entity; rather, such claim should be construed merely to require that the overall combination which implements the invention must, as a whole, implement at least the functions called for by the claims.

What is claimed is:

1. A cutting insert for threaded fasteners, comprising:
   a. a plate member with planar faces and edges;
   b. a blunt shape disposed at a leading edge of the insert; and
   c. at least one thread protrusion on a side edge for cutting a groove to thereby provide a track into which threads of a fastener follow.

2. A fastener in combination with the cutting insert of claim 1.

3. The cutting insert according to claim 1, wherein at least one protrusion for cutting said groove includes two protrusions.

4. The cutting insert according to claim 3, wherein said two protrusions are positioned at opposed edges of said insert, respectively.

5. The cutting insert according to claim 1, wherein the blunt shape is approximately a straight edge.

6. A combination threaded fastener and cutting insert, comprising:
   a. a threaded fastener having a slit at an end thereof; and
   b. a cutting insert including a blunt shape disposed at a leading edge, and at least one thread protrusion on a side edge for cutting a groove to thereby provide a track into which threads of a fastener follow.

7. The combination fastener and cutting insert according to claim 6, further comprising two flat sides parallel to one another.

8. The fastener of claim 7, wherein the shank diameter is the root diameter.

9. The fastener of claim 7, wherein the insert has a leading edge that is approximately flush with a terminal end of the shank.

10. The fastener of claim 7, wherein the insert includes a straight leading edge.

11. The combination fastener and cutting insert according to claim 6, wherein the threaded fastener is a masonry fastener.

12. The fastener of claim 11, wherein the insert includes a first and second protrusion provided, respectively, on the left and right edge of the insert.

13. The combination fastener and cutting insert according to claim 6, wherein said at least one protrusion for cutting said groove includes two protrusions.

14. The combination fastener and cutting insert according to claim 13, wherein said two protrusions are positioned at opposed edges of said insert, respectively.

15. A fastener, comprising:
   a shank having a diameter, a first end, second end, and a helical threading;
   a head disposed at the first end;
   a slit formed at the second end and defining a passageway extending over the diameter of the shank;

a cutting insert received in the slit, the insert having left and right edges defining a lengthwise extent that is approximately equal to the shank diameter and wherein at least one thread protrusion is provided on one of the edges for cutting a groove to thereby provide a track into which threads of the shank follow.

16. A process of providing a cutting insert for fasteners, comprising the steps of:
  a. providing a cutting insert;
  b. providing a fastener and a slit at a tip of said fastener, the slit extending through the diameter of the shank;
  c. shaping said cutting insert to fit into said slit at said tip of said fastener such that a blunt, terminal end of said cutting insert is disposed proximal the terminal end of the shank; and
  d. placing said cutting insert into said slit.

17. The process of providing a cutting insert for fasteners according to claim 16, wherein said insert is shaped to include two flat sides parallel to one another.

18. The process of providing a cutting insert for fasteners according to claim 16, further comprising the step of shaping said cutting insert to include at least one thread protrusion for cutting a groove to thereby provide a track into which threads of said fastener follow.

19. The process of providing a cutting insert for fasteners according to claim 18, wherein said at least one protrusion for cutting said groove includes two protrusions.

20. The process of providing a cutting insert for fasteners according to claim 19, wherein said two protrusions are positioned at distal ends of said insert, respectively.

* * * * *